UNITED STATES PATENT OFFICE.

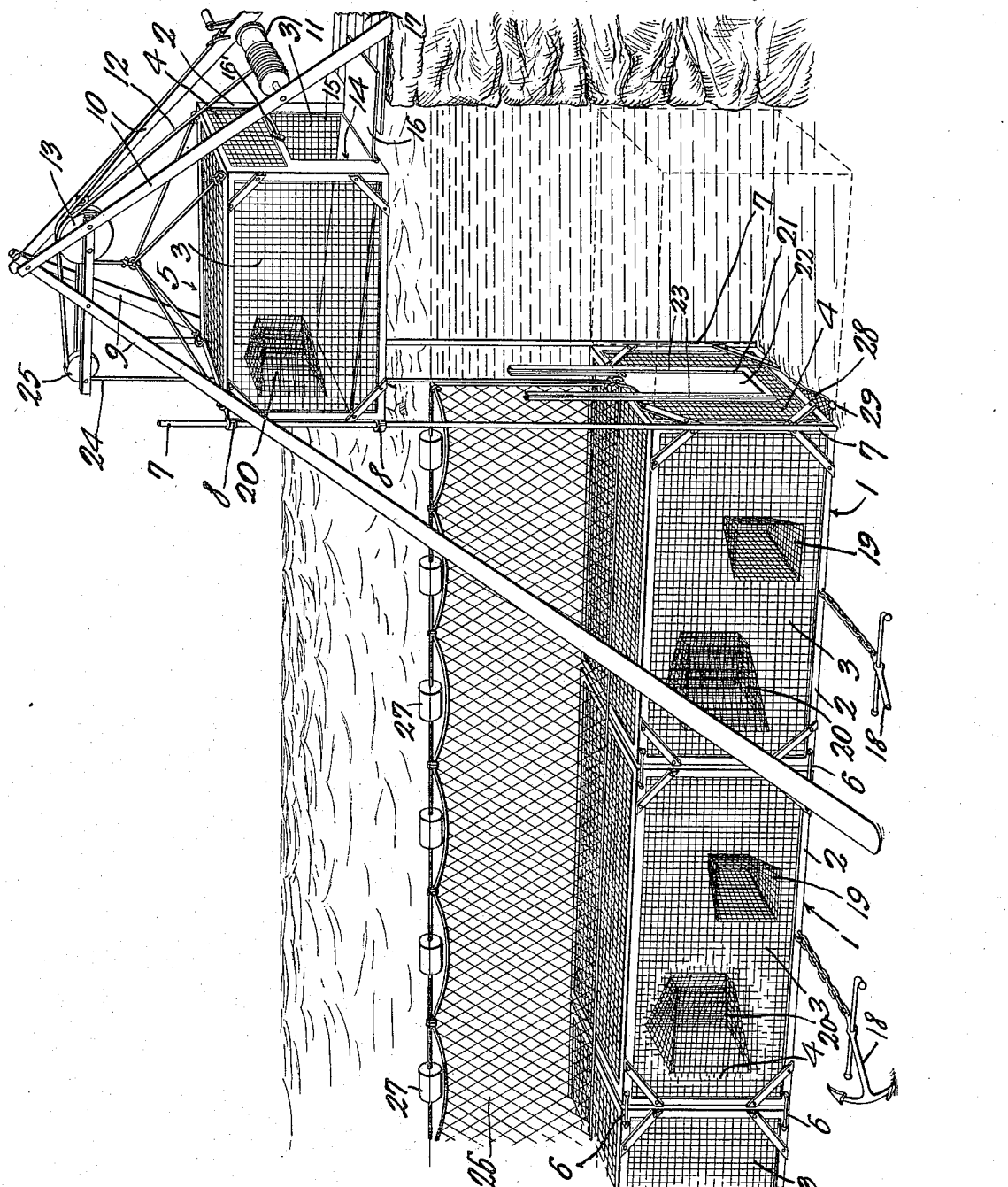

GEORGE WASHINGTON WILKERSON, OF ROGERSVILLE, MISSOURI.

FISH-TRAP.

1,146,911.  Specification of Letters Patent.  Patented July 20, 1915.

Application filed December 23, 1913. Serial No. 808,462.

*To all whom it may concern:*

Be it known that I, GEORGE W. WILKERSON, a citizen of the United States, residing at Rogersville, in the county of Webster and State of Missouri, have invented a new and useful Fish-Trap, of which the following is a specification.

The present invention appertains to fish traps, and aims to provide a novel and improved apparatus for catching fish.

It is the object of the present invention to provide a fish trap which may be disposed in a stream for catching or entrapping the fish, and which shall be provided with means whereby the entrapped fish may be conveniently and readily brought to the surface and discharged onto the bank of the stream.

It is also within the spirit of the present invention, to provide a fish trap of the nature indicated, embodying a unique assemblage of parts, to best carry out the results desired, and whereby the apparatus will be comparatively simple and inexpensive in construction, as well as being simple, convenient, practical and efficient in its use.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein the figure is a perspective view of the apparatus, as in use, portions being broken away, and the elevator section or cage being raised.

In carrying out the present invention, there are employed a plurality of series of cages or sections 1, which are disposed end to end, upon the bed of the stream or body or water, each of the cages embodying a suitable frame 2 having the meshed wire or reticulated sides 3 and meshed wire or reticulated ends 4 attached thereto, as well as reticulated or fabric top and bottom. Any number of the cages or sections 1 may be employed, so that the same may extend from one bank of the stream to the other, if desired.

Coöperating with the end cage or section 1, is an elevator cage or section 5 embodying a frame 2, similar to the cages or sections 1, having the reticulated sides 3 and ends 4 attached thereto, as well as a reticulated top.

The frames 2 of the cages or sections 1 are secured end to end, by means of links or other suitable coupling or fastening members 6 which permit of the ready attachment or detachment of the cages or sections 1, as is necessary or desirable.

In order to properly guide the elevator cage 5 for vertical movements, a pair of vertical guide rods 7 are disposed adjoining the free end of the end cage or section 1, the lower ends of the guide rods 7 being preferably driven into the bed of the stream. The outer end of the elevator cage 5 is provided with eyes or loops 8 embracing the guide rods 7, whereby the elevator cage 5 will be constrained to move vertically to and from the free end of the end cage 1.

As a means for raising and lowering the elevator cage 5, there is provided a supporting frame including the spars or timbers 9 standing astride the guide bars 7 and endmost cages or sections 1, and having their lower ends engaging the bed of the stream, and a pair of spars or timbers 10 connected to the upper ends of the spars 9 and having their lower ends engaged to or supported upon the bank of the stream. A suitable winch or windlass 11 is carried by the spars 10 so as to be readily accessibly from the bank of the stream, and a cable or chain 12 is connected to the windlass, and is trained over a pulley or sheave 13 carried by the upper ends of the spars 9 and 10, the free end of the cable or chain 12 being attached to the top of the elevator cage 5.

The bottom 14 of the elevator cage 5 is inclined from the outer end to the inner end of the said cage, and the inner end of the said cage is provided with a doorway or opening 15, which is normally closed by a door 16 hinged to the frame of the cage 5 at the forward or inner end of the bottom 14 and at the lower end of the opening 15. A suitable latch 16' is provided at the upper end of the opening 15 for engaging the free end of the door 16 to normally hold the door closed. The bottom or chute 14 is inclined from the lower end of the opening 15 to a point below the inlet leader 20 of the cage 5. When the elevator cage is raised above the bank of the stream, the door 16 may be swung open so as to rest on a suitable platform 17 provided on the bank, the door 16 thus forming a continuation or extension of the bottom 14, to serve as a chute for readily discharging the fish from out of the cage 5 onto the platform 17, as will be obvious.

The cages or sections 1 are disposed upon the bed of the stream, and are held stationary thereon, by means of anchors 18 connected to the frames of the cages 1 by means of chains, and extended upstream and engaged to the bed of the stream.

The sides 3 of the cages 1 are provided with inwardly projecting inlets or leaders 19, of tapered or frusto-pyramidal form, and which have their walls independent and yieldable, so as to readily permit the fish to pass through the inlets or leaders 19 into the cages, but preventing the escape of the fish, through the inlets 19, after the fish have once entered the cages 1. The outer end of each cage 1, or that end remote from the elevator cage 5, is provided with a similar inlet or leader 20, while the other ends of the cages 1 are provided with openings registering with the inlets or leaders 20. Thus, the fish may pass from one cage or section 1, to another, toward the elevator cage 5, but cannot pass from one cage 1 to the other, away from the elevator cage 5, so that the fish will be constrained to approach the elevator cage 5, in passing from one stationary cage 1 to the other. The outer end of the elevator cage 5 is provided with a similar inlet or leader 20, which coöperates or registers with an opening 21 in the inner end of the end cage 1. The opening 21 of the end cage 1 may be closed by means of a vertically moving door or gate 22 mounted between the guides or slideways 23 carried by the inner end of the end cage 1. To permit the door or gate 22 to be opened and closed, a cord 24 is attached to the upper end of the door or gate 22 and is trained over an upper pulley or guide 25, so as to extend to the bank or shore of the stream.

In order to prevent the fish from passing above the stationary cages or sections 1, a net or seine 26 is preferably attached to the tops of the cages 1, and is provided at its upper or free edge with floats 27 for maintaining the net or seine 26 in position between the surface of the stream and the cages 1. Thus, the fish will be prevented from passing over the cages 1, and will thus be directed to pass through the leaders 19 in their desire to pass down or upstream. Should the bottom or bed of the stream be uneven, a net or seine 28 may be attached to the bottoms of the cages 1, and provided with weights 29, for causing the net or seine 28 to drop into any depressions or valleys in the bed of the stream, for preventing the fish from passing therethrough underneath the trap.

The operation and advantages of the present device, will be somewhat obvious from the foregoing, taken in connection with the drawing. Ordinarily, the elevator cage 5 will be lowered, and the door or gate 22 will be opened or raised by pulling the cord 24 and tying the same. Thus, the fish in entering the stationary cages 1 and passing from one cage to another, will finally pass into the elevator cage or confinement chamber 5. From time to time, the elevator cage 5 may be raised by the operator or attendant, so that the door 16 may be swung open to permit the entrapped fish to be discharged onto the platform 17 on the bank of the stream. After the cage 5 has been emptied, the door 16 may be closed, and the said cage may again be lowered, to receive the fish from the stationary cages 1, it being observed that when the elevator cage is raised, the door 22 will be lowered or closed, so as to prevent the fish from escaping from the endmost cage 1, while the elevator cage is raised.

Having thus described the invention, what I claim as new is:—

In a fish trap, a series of stationary cages adapted to be disposed end to end upon the bed of a body of water and having inlets at their sides, means for coupling the ends of the cages together, an elevator cage normally coöperating with the endmost stationary cage, the adjoining ends of all of the cages having communicating openings for the passage of fish from one stationary cage to the other and finally into the elevator cage, means for raising the elevator cage, a net attached to the tops of the stationary cages and having floats at its upper edge, a net attached to the bottom of the stationary cages and having weights for dropping the same into depressions in the bed of the body of water, and anchors connected to the stationary cages to hold them in place upon the bed of the body of water.

In testimony that I claim the foregoing as my own, I have hereto affixed my signature in the presence of two witnesses.

GEORGE WASHINGTON WILKERSON.

Witnesses:
F. A. DELZELL,
B. H. DELZELL.

Copies of this patent may be obtained for five cents each, by addressing the "Commissioner of Patents, Washington, D. C."